US007617084B1

(12) United States Patent
Koslow et al.

(10) Patent No.: US 7,617,084 B1
(45) Date of Patent: Nov. 10, 2009

(54) MECHANISM AND METHOD FOR SIMULTANEOUS PROCESSING AND DEBUGGING OF MULTIPLE PROGRAMMING LANGUAGES

(75) Inventors: Douglas J. Koslow, Boxborough, MA (US); Leonardo Valencia, Germansville, PA (US); Mark Harris, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 614 days.

(21) Appl. No.: 10/784,125

(22) Filed: Feb. 20, 2004

(51) Int. Cl.
*G06F 17/50* (2006.01)
(52) U.S. Cl. ............... 703/14; 714/741; 717/124; 716/4
(58) Field of Classification Search .............. 703/14
See application file for complete search history.

(56) References Cited

U.S. PATENT DOCUMENTS

| | | | | |
|---|---|---|---|---|
| 5,911,059 | A * | 6/1999 | Profit, Jr. ............... | 703/23 |
| 6,182,258 | B1 * | 1/2001 | Hollander ............... | 714/739 |
| 6,188,975 | B1 * | 2/2001 | Gay ............... | 703/22 |
| 6,226,780 | B1 * | 5/2001 | Bahra et al. ............... | 716/18 |
| 6,263,303 | B1 * | 7/2001 | Yu et al. ............... | 703/19 |
| 6,466,898 | B1 * | 10/2002 | Chan ............... | 703/17 |
| 6,581,191 | B1 * | 6/2003 | Schubert et al. ............... | 716/4 |
| 6,587,995 | B1 * | 7/2003 | Duboc et al. ............... | 716/4 |
| 7,017,097 | B1 * | 3/2006 | Moore et al. ............... | 714/742 |
| 7,035,781 | B1 * | 4/2006 | Flake et al. ............... | 703/14 |
| 7,058,562 | B2 * | 6/2006 | Powell ............... | 703/22 |
| 7,117,139 | B2 * | 10/2006 | Bian ............... | 703/13 |
| 7,146,300 | B2 * | 12/2006 | Zammit et al. ............... | 703/13 |
| 7,464,373 | B1 * | 12/2008 | Yunt et al. ............... | 717/125 |

OTHER PUBLICATIONS

Martinolle et al, "A Procedural Language Interface for VHDL", Proceedings of the Verilog HDL Conference and VHDL International Users Forum, 1998, pp. 32-38.*
McKinney, Michael, "Integrating Perl, Tcl and C++ into Simulation-Based ASIC Verification Environments", Proceedings of the 6th IEEE International High-Level Design Validation and Test Workshop, 2001, pp. 19-24.*
Bombana et al, "SystemC-VHDL Co-Simulation and Synthesis in the HW Domain", Design, Automation and Test in Europe Conference and Exhibition, 2003, pp. 101-105.*
Benini et al, "SystemC Cosimulation and Emulation of Multiprocessor SoC Designs", IEEE Computer Society, Apr. 2003, pp. 53-59.*
Gailser Research, "TSIM Simulator User's Manual", Version 1.2, Jun. 2003, sections 1, 3 (best available copy, obtained from Google Scholar, html version of www.orbitabluebox.com/pdf/english/tsim-1.2.pdf+).*

(Continued)

*Primary Examiner*—Paul L Rodriguez
*Assistant Examiner*—Mary C Jacob
(74) *Attorney, Agent, or Firm*—Vista IP Law Group, LLP (57) ABSTRACT

Disclosed is a method, mechanism, and computer usable medium for simultaneous processing or debugging of multiple programming languages. A particularly disclosed approach provides a method and mechanism for resolving the issue of simultaneous debugging of hardware represented by an HDL, e.g., Verilog or VHDL, and software, e.g., represented by C, C++, SystemC code. This approach overcomes the problem of the HDL portion of the design being inaccessible when C, C++ or SystemC code is debugged.

38 Claims, 5 Drawing Sheets

OTHER PUBLICATIONS

Stallman et al, "Debugging with GDB: The GNU Source-Level Debugger", Jan. 2002, book summary, obtained on www.gnu.org.*
Guerra et al, "Cycle and Phase Accurate DSP Modeling and Integration for HW/SW Co-Verification", DAC '99, New Orleans, LA, 1999.*
Olcoz et al, "VHDL Virtual Prototyping" Proceedings of the 6th IEEE International Workshop on Rapid System Prototyping, Jun. 7-9, 1995, pp. 161-167.*
Fummi et al, "Native ISS-SystemC Integration for the Co-Simulation of Multi-Processor SoC", Proceedings of Design, Automation and Test in Europe Conference and Exhibition, Feb. 16-20, 2004, vol. 1, pp. 564-569.*
Martionelle et al, "Mixed Language Design Data Access: Procedural Interface Design Considerations", Proceedings of the 2000 VHDL International Users Forum Fall Workshop, Oct. 18-20, 2000, pp. 95-99.*
Bian et al , "VIDE: A Visual VHDL Integrated Design Environment", Proceedings of the ASP-DAC'97, Jan. 28-31, 1997, pp. 383-386.*
Martionelle et al, "Mixed Language Design Data Access: Procedural Interface Design Considerations", VHDL International Users Forum Fall Workshop, 2000, Proceedings, Oct. 18-20, 2000, pp. 95-99.*
Damasevicius, R. et al. "Separation of Concerns in Multi-Language Specifications" Informatica, 2002, vol. 13, No. 3, pp. 1-20.
Jerraya, A. et al. "Multi-Language System Design" Proceedings of the 1999 Design, Automation and Test in Europe Conference and Exhibition, Munich, Germany, Mar. 9-12, 1999, pp. 696-699.
Kleinjohann, B. "Multilanguage Design" Proceedings of the International Federation for Information Processing (IFIP) WG 10.3/WG 10.5, 1998, 14 pgs.
Mahajan, R. et al. "A Multi-Language Goal-Tree Based Functional Test Planning System" Proceedings of the 2002 International Test Conference. Oct. 7-10, 2002, pp. 472-481.
Mills, M. et al, "Hardware/Software Co-design: VHDL and Ada 95 Code Migration and Integrated Analysis" Proceedings of the 1998 Annual ACM SIGAda International Conference on Ada, Washington, DC, 1998, pp. 18-27.

* cited by examiner

MECHANISM AND METHOD FOR SIMULTANEOUS PROCESSING AND DEBUGGING OF MULTIPLE PROGRAMMING LANGUAGES

BACKGROUND AND SUMMARY

The present invention relates to development systems, such as development systems for software and circuit design.

There is a large number of programming languages that are used in modern development projects. Examples of common general purpose programming languages include C and C++. Specialized programming languages are also used for specific types of development projects. For instance, many electrical circuits and systems are designed and modeled using specialized programming languages referred to as HDLs (Hardware Description Languages). Examples of commonly used HDLs include VHDL and Verilog.

It is sometimes desirable to use general purpose programming languages for specialized development projects. For example, if it is desired to use the C++ language for electrical hardware design and modeling, this language can be modified to add hardware-oriented constructs as a class library. This type of use for general programming languages may span design and verification from concept to implementation in hardware and software. An example of a commonly adopted standard for implementing these modifications to the C++ language is the SystemC initiative, which provides an interoperable modeling platform that enables the development and exchange of very fast system-level C++ models. Further information about the SystemC initiative can be obtained from the Open SystemC Initiative (OSCI), which has a website at "www.systemc.org."

It is also sometimes desirable to implement a design using a mixture of two or more programming languages. With electrical circuit designs, for example, this may result in a design that is implemented using both Verilog and C++, or a design having both VHDL and SystemC components. There may be a number of reasons for this, e.g., to reuse and link in modules developed in another language, because it is easier to perform certain operations or implement certain component properties in one type of language versus another type of language, or because of a desire to use legacy systems and developments.

When simultaneously working with multiple programming languages, incompatibilities in the interface, operations, or processing of the different languages may cause problems during the development project. Consider if it is required to debug a electrical design involving both an HDL and a general purpose programming language such as C++. A circuit simulator may be used to debug the HDL portion of the design while an external C++ debugger may be used to debug the C++ portion of the design. It is often useful during the debugging process to switch back and forth between the two types of languages.

For example, when debugging the C++ code, the designer may see a value that came from the HDL code, so the designer may want to go to design to look at values of the HDL code. But in typical design systems, this may not possible since the external debugger operating upon the C++ portion of the design may interrupt the simulator during its debug operation. If the simulator is interrupted, then it may not be possible to operate the simulator interface to produce the desired result or retrieve values from the simulator. This highlights a significant disadvantage of conventional debugging environments for designs having mixed HDL and general programming language code, which suffer from the limitation of the HDL code becoming inaccessible when the general purpose programming language portion is debugged.

An embodiment of the present invention is directed to a method, mechanism, and computer usable medium for simultaneous processing or debugging of multiple programming languages. A particular embodiment provides a method and mechanism for resolving the issue of simultaneous debugging of hardware represented by an HDL, e.g., Verilog or VHDL, and software, e.g., represented by C, C++, SystemC code.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using like reference numbers.

DETAILED DESCRIPTION

An embodiment of the present invention is directed to a method, mechanism, and computer usable medium for simultaneous processing or debugging of multiple programming languages. A particular embodiment provides a method and mechanism for resolving the issue of simultaneous debugging of hardware represented by an HDL, e.g., Verilog or VHDL, and software, e.g., represented by C, C++, SystemC code. This approach overcomes the problem of the HDL portion of the design being inaccessible when C, C++ or SystemC code is debugged.

For illustrative purposes, the specific embodiment(s) set forth below are directed to an approach for implementing simultaneous debugging of a design having multiple programming languages. It is noted, however, that the present invention may be applied to other types of simultaneous processing involving multiple languages, and is not limited in its scope only to debugging applications.

Figure 1:
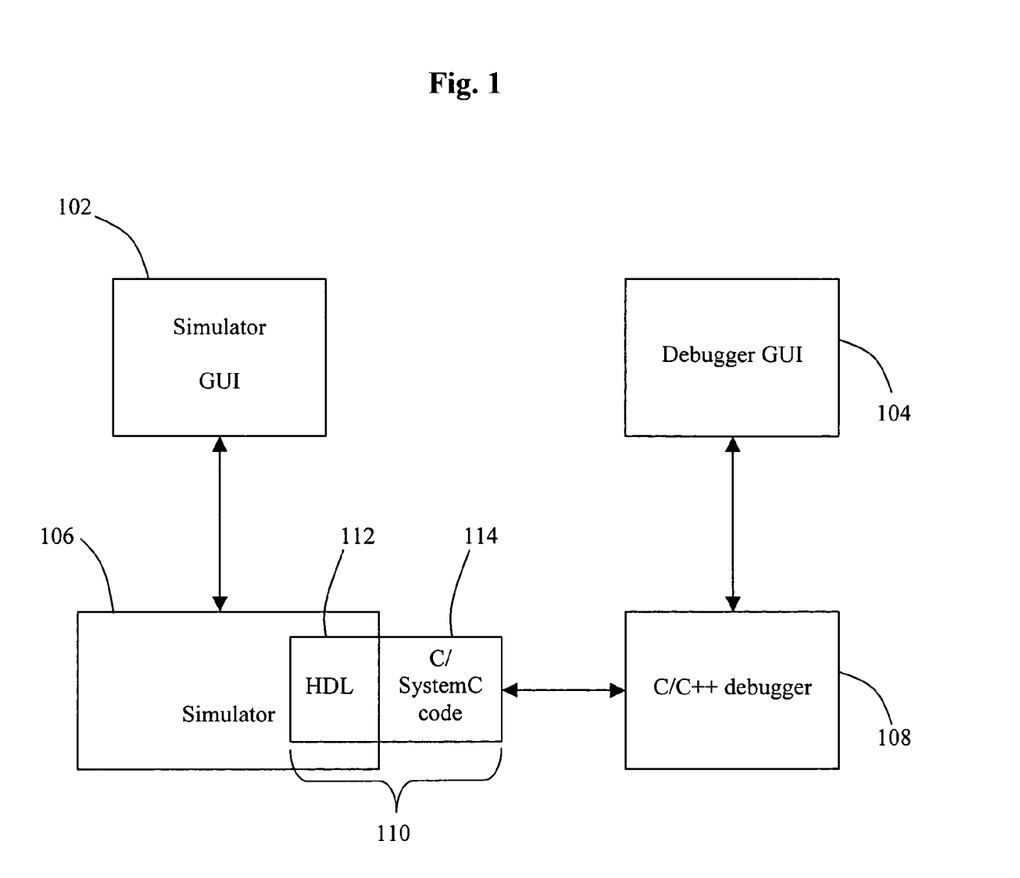
FIG. 1 shows an example architecture for implementing debugging of a design having both HDL code and general purpose programming code.

FIG. 1 shows an example architecture for implementing debugging of a design having both HDL code and general purpose programming code. In the architecture diagram of FIG. 1, there are 4 separate processes 102, 104, 106, and 108 being executed on a host computing environment. The simulator GUI (graphical user interface) process 102 provides an interface mechanism to the simulator process 106. The simulator GUI process 102 provides an interface for placing and sending user requests and displaying results to/from the simulator process 106. An exemplary simulator GUI 102 and simulator 106 that may be used to implement the architecture of FIG. 1 is the SimVision and NC-Sim products, respectively, both of which are available from Cadence Design Systems, Inc. of San Jose, Calif. The debugger GUI process 104 provides an interface mechanism to the C/C++ debugger process 108. The debugger GUI process 104 provides an interface for placing and sending user requests and displaying results to/from the C/C++ debugger process 108. An example debugger GUI process 104 and C/C++ debugger process 108 that may be used to implement the architecture of FIG. 1 is the "ddd" and "gdb" products, respectively, both of which are available from www.gnu.org. It is noted that the term "process" as used in this section refers to any entity or system component that is capable of suitably implementing the functions/features of the described processes 102, 104, 106, and 108, and is not intended to be to limited to only "processes", but may encompass other entities such as threads, programs, or tasks.

Simulator process 106 operates upon a design 110 that includes a HDL code portion and a C/SystemC portion 114 that may be linked into the HDL portion 112. During simulation, the simulator process 106 models and/or simulates the effect and operation of design 110. The simulation may be controlled by user requests or instructions sent through simulator GUI process 102. Results from the modeling/simulation are returned from the simulator process 106 to be displayed at the simulator GUI process 102.

In conventional systems, when the user instructs the C/C++ debugger process 108 to interrupt the simulator process 106 in order for the user to debug the C/SystemC portion 114 of their design 110, the simulator process 106 is at that point unable to process any further requests from the simulator GUI process 102. This prevents, for example, the user from being able to access to the HDL portion 112 of the design 110, e.g., to view HDL signal values or to explore the HDL design structure.

It is desirable to implement a unified debugging environment in which both the HDL portion 112 and general purpose programming language portion 114 can be debugged at the same time. However, in conventional systems, this is impeded by the fact that interrupting the simulator process 106 executing the HDL will also cause the software to "hang", since the software is linked into and executed by the same simulator process as the HDL. Hence attempting to debug the software will "hang" the HDL simulator not allowing, for example, the user to access values of HDL signals while the software is being debugged.

Figure 2:
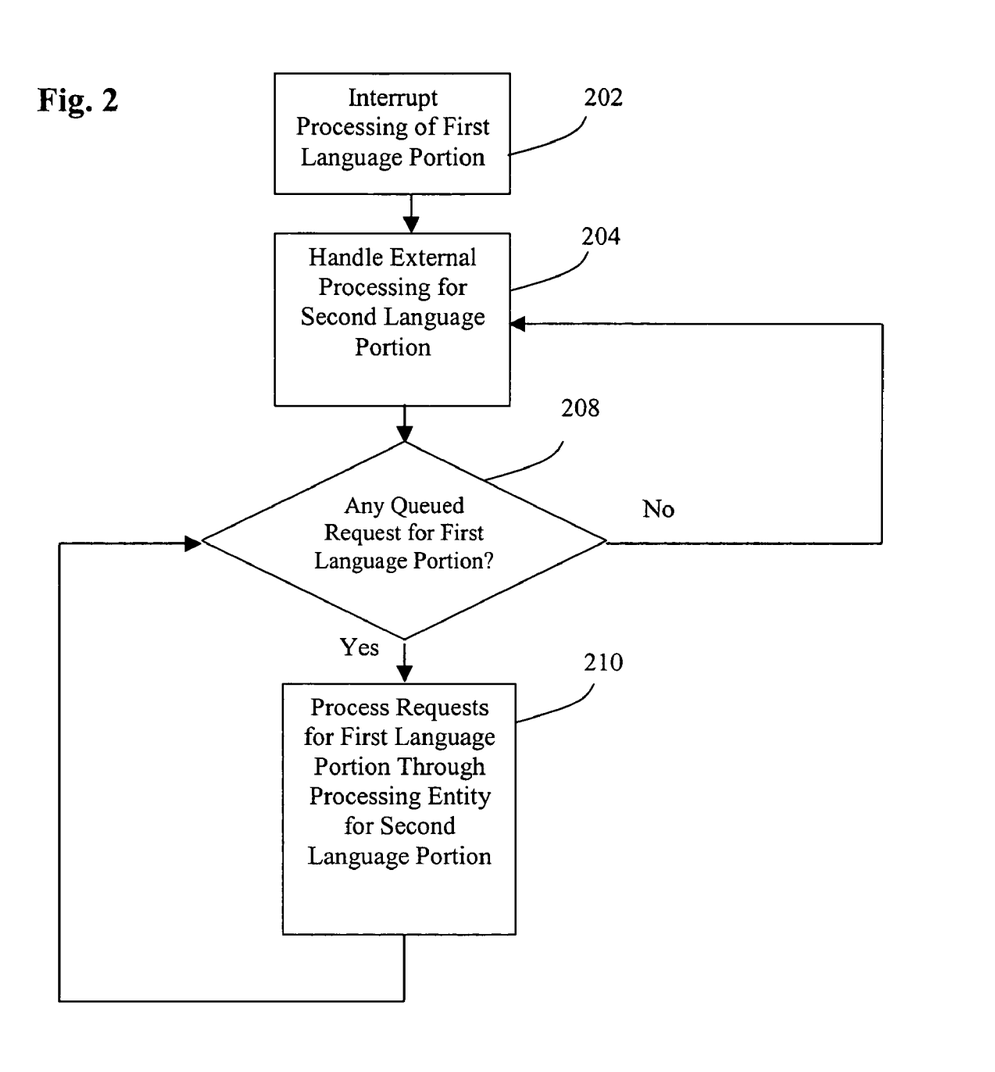
FIG. 2 depicts a flowchart of a process for simultaneous processing/debugging of a design having multiple programming languages according to an embodiment of the invention.

FIG. 2 shows a flowchart of a general process for performing simultaneous processing or debugging of multiple programming languages. At 202, an interruption occurs for the processing of a first language portion of the system. This may occur, for example, by initializing a process for debugging a second language portion of the system. During the interruption, external processing may occur for the second language portion of the system (204).

During the time that the second language portion is being handled, one or more requests may have been issued for the first language portion that could not be processed because the first language portion is presently interrupted. At 208, a check is made to determine whether any such requests for the first language portion had been made but not processed. For example, such requests may be placed on queue of waiting requests if the first language portion is interrupted. The checking action of 208 may be performed by determining whether the queue contains one or more waiting requests for the first language portion. The action of 208 may be performed according any appropriate scheduling algorithm. For example, the first language portion may send an explicit/immediate message to the second language portion. Alternatively, the wait queue can be checked on a regular or periodic manner. As another example, a demand-driven approach can be made, in which a threshold number of waiting requests for the first language portion will cause the initiation of the action of 208.

If there are no waiting requests for the first language portion, then the process of FIG. 2 returns back to 204 to continue handling the second language portion of the system.

If, however, there are one or more queued requests for the first language portion, then some or all of those queued requests are handled by processing the requests through the second language portion of the system (210). According to this embodiment, the second language portion includes functionality to call an external function, in which at least one specific external function is configured to operate requests within the first language portion. Thus, even thought the first language portion has been interrupted to handle the second language portion, the first language portion includes an externally callable functionality that can be called by the second language portion. The externally callable functionality processes the queued requests that are now being handled via the second language portion.

Figure 3:
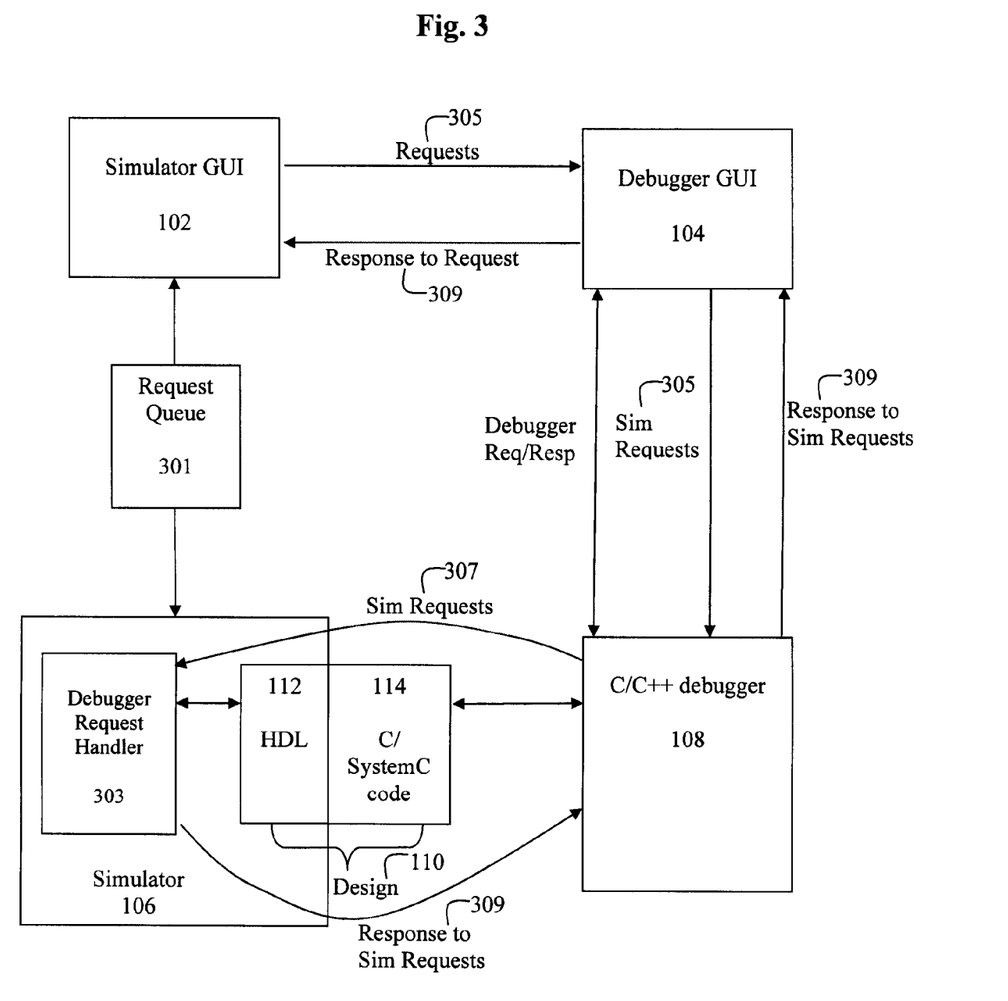
FIG. 3 illustrates the example architecture of FIG. 1 using an embodiment of the invention to implement debugging of a design having both HDL code and general purpose programming code.

FIG. 3 illustrates how this approach can be applied to handle simultaneous debugging of HDL and external general programming statements according to one embodiment of the invention. To facilitate the explanation of FIG. 3, the structures and call numbers of FIG. 1 have been duplicated in FIG. 3. The simulator GUI (graphical user interface) process 102 provides an interface mechanism to the simulator process 106. The simulator GUI process 102 provides an interface for placing and sending user requests and displaying results to/from the simulator process 106. The debugger GUI process 104 provides an interface mechanism to the C/C++ debugger process 108. The debugger GUI process 104 provides an interface for placing and sending user requests and displaying results to/from the C/C++ debugger process 108. As noted above, an example debugger GUI process 104 and C/C++ debugger process 108 that may be used to implement the architecture of FIG. 1 are the "ddd" and "gdb" products, respectively.

Simulator process 106 operates upon a design 110 that includes a HDL code portion and a C/SystemC portion 114 that may be linked into the HDL portion 112. During simulation, the simulator process 106 models and/or simulates the effect and operation of design 110. The simulation may be controlled by user requests or instructions sent through simulator GUI process 102. Results from the modeling/simulation are returned from the simulator process 106 to be displayed at the simulator GUI 102.

In conventional systems, when the user instructs the C/C++ debugger process 108 to interrupt the simulator process 106 in order for the user to debug the C/SystemC portion 114 of their design 110, the simulator process 106 is at that point unable to process any further requests from the simulator GUI process 102. This prevents, for example, the user from being able to access to the HDL portion 112 of the design 110, e.g., to view HDL signal values or to explore the HDL design structure.

In the presently described embodiment, requests 305 from simulator GUI process 102 are sent via debugger GUI process 104 for processing by the C/C++ debugger process 108. The C/C++ debugger process 108 performs an external call 307 to a debugger request handler function 303 to process the simulator requests 305. The debugger request handler function 303, when invoked, is configured to process the requests at the simulator 106 that have been passed to the function 303. The idea is that an appropriate function (e.g., the debugger request handler function 303) has been set up ahead of time such that it can be called to process requests. In effect, the C/C++ debugger will make an external call to this function to allow the simulator process to temporarily become un-interrupted to handle the pending requests, and then return control back to the C/C++ debugger.

For example, assume that the specific C/C++ debugger process 108 being used is the gdb debugger product. Program functionality can be called from within the debugger using the command:

call expr

This command evaluates the expression expr, and can be used by the C/C++ debugger process 108 to call a function within the simulator process 106. Even if the simulator process 106 has been interrupted by the C/C++ debugger process 108, requests can still be processed by handling the requests using the C/C++ debugger process 108. In this embodiment, this is accomplished by using the ability of the C/C++ debugger process 108 to call a function within the application being debugged, in this case the simulator process 106. A function is defined in the simulator process 106, which is the debugger request handler process 303, which when invoked, processes pending requests 305 from the simulator request queue 301.

The debugger request handler process 303 is executed and the simulator response 309 is returned to the simulator GUI process 102 via the C/C++ debugger process 108 and debugger GUI process 104.

To illustrate, consider when a user requests HDL design data from the simulator process 106 while it is being interrupted by the C/C++ debugger process 108. The simulator GUI process 102 has not been interrupted and is still accepting user requests. These requests are routed from the simulator GUI process 102 to the C/C++ debugger process 108. The requests may be routed though the debugger GUI process 104 or directly to the C/C++ debugger process 108 (or even from the request queue 301 in an alternate embodiment). This process may be initiated by sending a message to the C++ debugger process 108 to call the debug request handler function 303. When this function is executed, the pending requests from the simulator GUI 102 are processed and the results displayed. Hence, even when the simulator process 106 is interrupted, the user is able to access HDL data in the simulator process 106.

Figure 4:
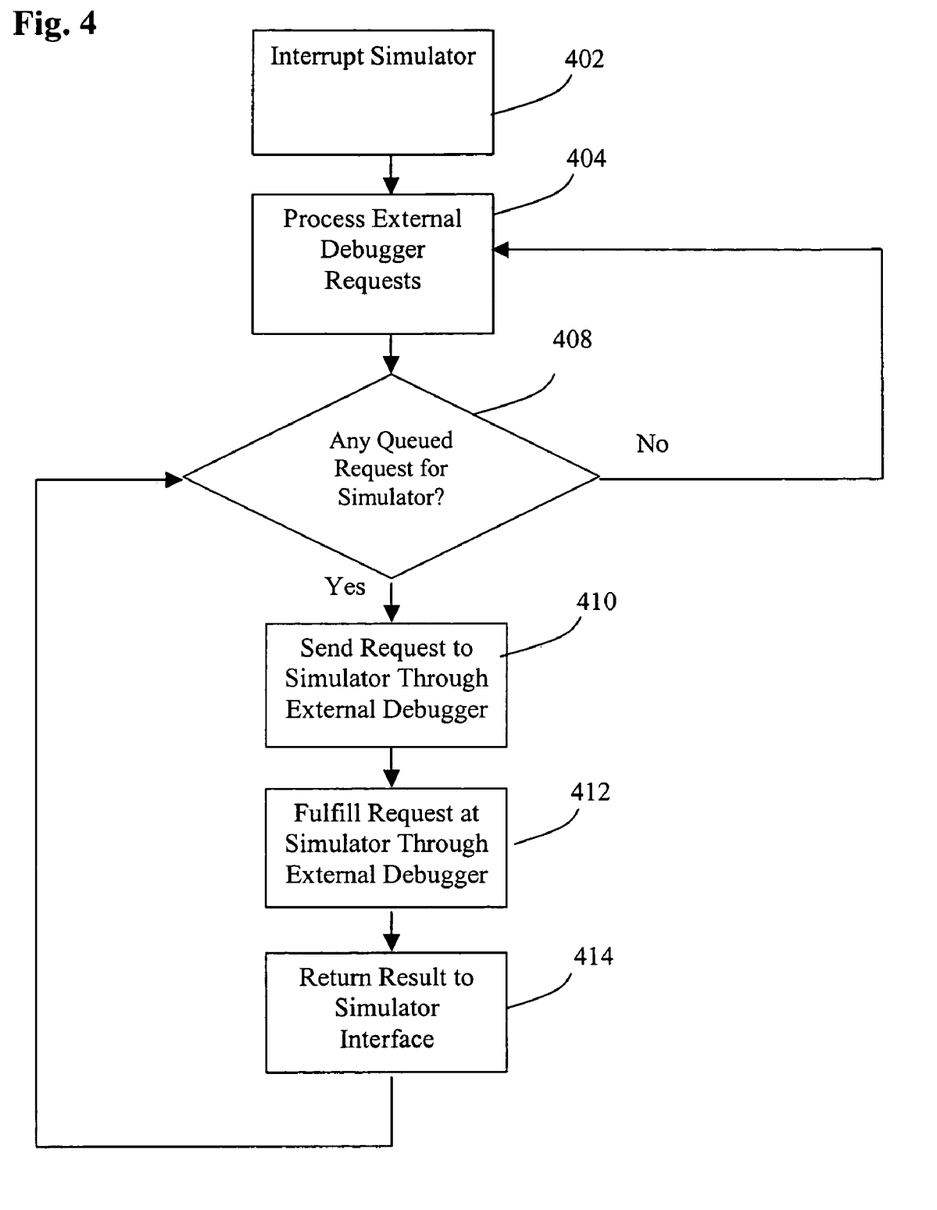
FIG. 4 depicts a flowchart of a process for simultaneous debugging of a design having both HDL code and general purpose programming language code according to an embodiment of the invention.

FIG. 4 shows a process for performing simultaneous debugging of HDL code and general purpose programming language code according to an embodiment of the invention. At 402, the simulator is interrupted, e.g., because the external C/C++ debugger has been initiated. At 404, external debugger requests are being handled by the C/C++ debugger.

At some point in the process, a determination is made whether queued requests for the simulator should be handled (408). Any appropriate scheduling approach can be utilized to specify when the determination of 408 should be performed. For example, the simulator GUI can send a message to the external C/C++ debugger to take this action. As another example, the request queue for the simulator GUI can be checked on a regular or periodic basis and the action of 408 is performed if a sufficient number of request(s) have been queued for the simulator.

If there is sufficient number of waiting request(s), then the request is sent to the simulator for processing via the external C/C++ debugger (410). As noted above, this can be accomplished by calling an external function from within the external debugger, in which the external function is within the program being debugged. For a simulator, the function is configured to process simulator requests. Therefore, at 412, the requests are fulfilled at the simulator using the call from the external C/C++ debugger. The results are thereafter returned to be displayed at the simulator GUI (414).

The approach of the present embodiment provides numerous advantages over alternative debugging solutions. For example, using the present approach, the user can access HDL signal values while debugging the C or SystemC code. Moreover, the user can peruse the HDL design hierarchy while debugging the C or SystemC code.

System Architecture Overview

Figure 5:
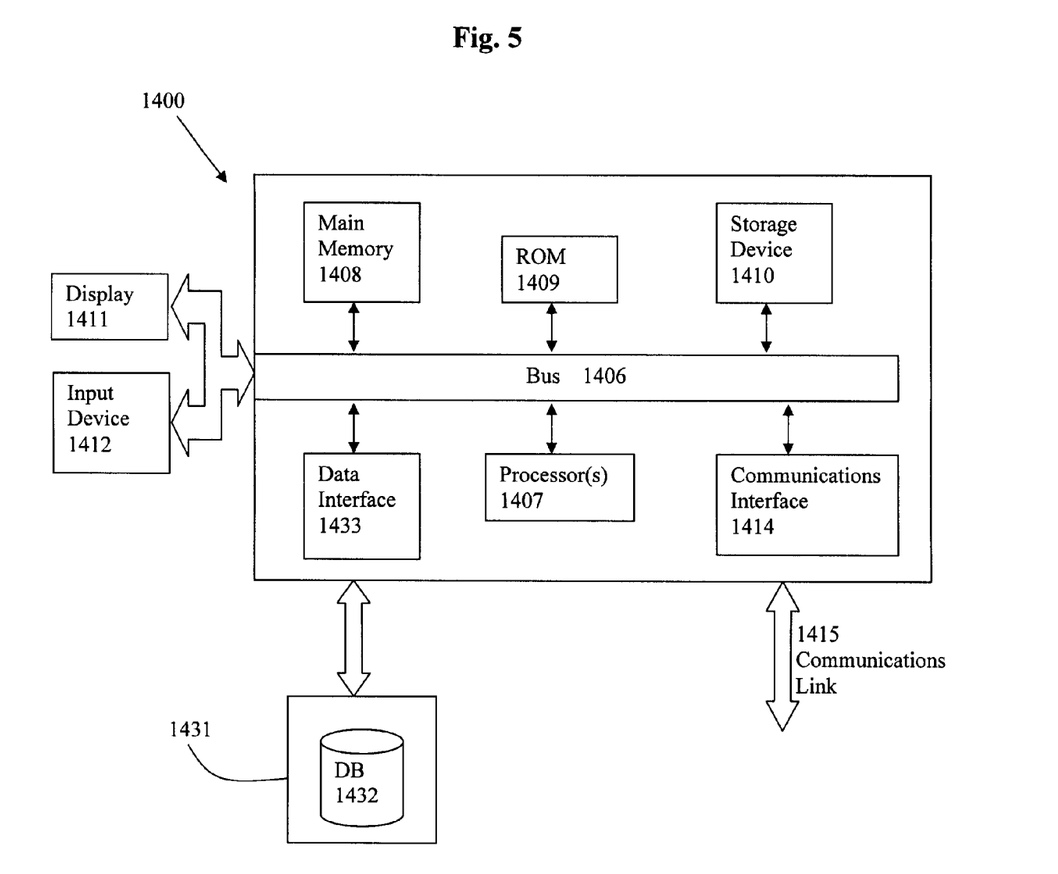
FIG. 5 is a diagram of a computer system with which the present invention can be implemented.

The execution of the sequences of instructions required to practice the invention may be performed in embodiments of the invention by a computer system 1400 as shown in FIG. 5. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for debugging an electronic design comprising both an HDL portion and a general programming language portion, comprising:

interrupting a simulator that operates upon the HDL portion of the electronic design to allow for debugging, by an external debugger, the general programming language portion of the electronic design, wherein the simulator receives a plurality of simulator requests for simulation of the HDL portion from a programming interface when the simulator is not interrupted;

handling one of the plurality of simulator requests, which is identified by and sent to the external debugger by the programming interface, with the external debugger for the simulator that is interrupted, the external debugger calling a request processing module at the simulator to process the one of the plurality of simulator requests, the plurality of simulator requests for the simulation of the HDL portion;

executing a process of the request processing module at the simulator to respond to the one of the plurality of simulator requests, wherein the act of executing the process of the request processing module is performed by a processor;

providing continued access to the HDL portion while debugging, by using the external debugger, the general programming portion; and generating debug results based upon the act of executing the process of the request processing module and storing the debug results in a computer-readable storage medium or a storage device or displaying the debug results on a display apparatus.

2. The method of claim 1 in which the simulator request accesses a portion of the HDL portion.

3. The method of claim 2 in which the simulator request accesses HDL signal values.

4. The method of claim 2 in which the simulator request accesses HDL design hierarchy.

5. The method of claim 1 in which the simulator request operates simulator functionality.

6. The method of claim 1 in which the general programming language portion comprises C, C++, or SystemC code.

7. The method of claim 1 in which the HDL portion comprises VHDL or Verilog.

8. The method of claim 1 in which the action of having the external debugger call the request processing function is based upon recognition of a waiting simulator request.

9. The method of claim 8 in which recognition of the waiting simulator request is based upon a message sent to the external debugger.

10. The method of claim 8 in which recognition of the waiting simulator request is based upon a periodic check of a simulator request wait queue.

11. The method of claim 8 in which recognition of the waiting simulator request is based on whether a threshold number of simulator requests are waiting in a simulator request wait queue.

12. The method of claim 1 in which the simulator request is generated at a simulator GUI.

13. The method of claim 12 in which the response to the simulator request is displayed at the simulator GUI.

14. The method of claim 1, wherein the external debugger that calls the request processing function at the simulator is a gdb debugger.

15. The method of claim 1 in which the simulator request is routed through a debugger GUI for the external debugger.

16. The method of claim 1 in which the simulator request is directly routed to the external debugger.

17. The method of claim 1 in which the request processing function is set up ahead of time at the simulator to handle anticipated simulator requests.

18. A computer implemented method for processing of a design that is based upon multiple programming languages, the design comprising a first language portion and a second language portion, the method comprising:

performing a first process on the second language portion of the design to cause an interruption of processing for the first language portion of the design, wherein the processing for the first language portion is interrupted to process the second language portion, and the first language portion receives a plurality of requests for the processing, for the first language portion from a programming interface when the first language portion is not interrupted;

determining whether there are one or more of the plurality of requests, which are identified by and sent to a processing module to perform the first process on the second language portion by the programming interface, waiting for the processing of the first language portion and indicating a need for the processing module to call a request processing function at the first language portion;

handling the one or more of the plurality of requests, which are identified by and sent to the processing module by the programming interface, for the processing of the first language portion by having the processing module call the request processing function at the first language portion that has been interrupted, at least one of the one or more of the plurality of requests for the processing of the first language portion;

executing the request processing function at the first language portion to process the one or more of the plurality of requests, wherein the act of executing the request processing function is performed by a processor;

providing continued access to the first language portion while performing the first process on the second portion, by using the processing module; and generating processing results based upon the act of executing the request processing function and storing the processing results in a computer-readable storage medium or a storage device or displaying the processing results on a display apparatus.

19. The method of claim 18 in which the one or more waiting requests are for accessing data from the first language portion of the design.

20. The method of claim 18 in which the one or more waiting requests are for debugging the first language portion.

21. The method of claim 18, wherein the act of determining whether there are one or more waiting requests for processing of the first language portion is based upon a message sent to a debugger for the processing of the second language portion.

22. The method of claim 18, wherein the act of determining whether there are one or more waiting requests for processing of the first language portion is based a periodic check of a request wait queue for the first language portion.

23. The method of claim 18, wherein the act of determining whether there are one or more waiting requests for processing of the first language portion is based on whether a threshold number of simulator requests are waiting in a request wait queue.

24. The method of claim 18, wherein the request processing function is called by a gdb debugger.

25. The method of claim 18 in which processing the second language portion comprises debugging the second language portion.

26. The method of claim 18 in which the request processing function is set up ahead of time to handle anticipated requests.

27. A computer program product comprising a computer readable storage medium having executable code, when executed by a computer, causes the computer to execute a process for debugging of an electronic design comprising both an HDL portion and a general programming language portion, the process comprising:

interrupting a simulator that operates upon the HDL portion of the electronic design to allow for debugging, by an external debugger, the general programming language portion of the electronic design, wherein the simulator receives a plurality of simulator requests for simulation of the HDL portion from a programming interface when the simulator is not interrupted;

handling one of the plurality of simulator requests, which is identified by and sent to the external debugger by the programming interface, with the external debugger for the simulator that is interrupted, the external debugger calling a request processing module at the simulator to process the one of the plurality of simulator requests, the plurality of simulator requests for simulation of the HDL portion;

executing a process of the request processing module at the simulator to respond to the one of the plurality of simulator requests, wherein the act of executing the process of the request processing module is performed by a processor;

providing continued access to the HDL portion while debugging, by using the external debugger, the general programming portion; and generating debug results based upon the act of executing the process of the request processing module and storing the debug results in a computer-readable storage medium or a storage device or displaying the debug results on a display apparatus.

28. A system for debugging of an electronic design comprising both an HDL portion and a general programming language portion, comprising:

means for interrupting a simulator that operates upon the HDL portion of the electronic design to allow for debugging, of the HDL portion, the simulator interrupted by an external debugger, to debug the general programming language portion of the electronic design, wherein the simulator receives a plurality of simulator requests for simulation of the HDL portion from a programming interface when the simulator is not interrupted;

means for handling one of the plurality of simulator requests, which is identified by and sent to the external debugger by the programming interface, with the external debugger for the simulator that is interrupted, the external debugger calling a request processing module at the simulator to process the one of the plurality of simulator requests, the plurality of simulator requests for simulation of the HDL portion;

a processor configured for executing a process of the request processing module at the simulator to respond to one of the plurality of the simulator requests;

means for providing continued access to the HDL portion while debugging, by using the external debugger, the general programming portion; and means for generating debug results based upon executing the process of the request processing module and a computer readable storage medium or a storage device configured for storing the debug results or a display apparatus configured for displaying the debug results.

29. A computer program product comprising a computer readable storage medium having executable code, when executed by a computer, causes the computer to execute a process for processing of a design that is based upon multiple programming languages, the design comprising a first language portion and a second language portion, the method comprising:

performing a first process on the second language portion of the design to cause an interruption of processing for the first language portion of the design, wherein the processing for the first language portion is interrupted to process the second language portion, and the first language portion receives a plurality of requests for the processing, for the first language portion from a programming interface when the first language portion is not interrupted;

determining whether there are one or more of the plurality of requests, which are identified by and sent to a processing module to perform the first process on the second language portion by the programming interface, waiting for the processing of the first language portion and indicating a need for the processing module to call a request processing module at the first language portion;

handling the one or more of the plurality of requests, which are identified by and sent to the processing module by the programming interface, for the processing of the first language portion by having the processing module call a request processing function at the first language portion that has been interrupted, at least one of the one or more of the plurality of requests for the processing of the first language portion;

executing the request processing function at the first language portion to process the one or more of the plurality of requests, wherein the act of executing the request processing function is performed by a processor;

providing continued access to the first language portion while performing the first process on the second portion, by using the processing module; and generating processing results based upon executing the request processing function and storing the processing results in a computer-readable storage medium or a storage device or displaying the processing results on a display apparatus.

30. A system for processing of a design that is based upon multiple programming languages, the design comprising a first language portion and a second language portion, the system comprising:

means for performing a first process on the second language portion of the design to cause an interruption of processing for the first language portion of the design, wherein the processing for the first language portion is interrupted to process the second language portion, and the first language portion receives a plurality of requests for the processing for the first language portion from a programming interface when the first language portion is not interrupted;

means for determining whether there are one or more of the plurality of requests, which are identified by and sent to a processing module to perform the first process on the second language portion by the programming interface, waiting for the processing of the first language portion and indicating a need for the processing module to call a request processing module at the first language portion;

means for handling the one or more of the plurality of requests, which are identified by and sent to the processing module by the programming interface, for the processing of the first language portion by having the processing module call a request processing function at the first language portion that has been interrupted, at least one of the one or more of the plurality of requests for the processing of the first language portion;

a processor configured for executing the request processing function at the first language portion to process the one or more of the plurality of requests and a computer readable storage medium or a storage device configured for storing processing results or a display apparatus configured for displaying the processing results; and means for generating processing results based upon executing the request processing function.

31. The computer program product of claim 27 in which the simulator request accesses a portion of the HDL portion.

32. The computer program product of claim 27 in which the general programming language portion comprises C, C++, or SystemC code.

33. The system of claim 28 in which the simulator request accesses a portion of the HDL portion.

34. The system of claim 28 in which the general programming language portion comprises C, C++, or SystemC code.

35. The computer program product of claim 29, wherein the request processing function is called by a gdb debugger.

36. The computer program product of claim 29 in which the one or more waiting requests are for debugging the first language portion.

37. The system of claim 30, wherein the request processing function is called by a gdb debugger.

38. The system of claim 30 in which the one or more waiting requests are for debugging the first language portion.

* * * * *

UNITED STATES PATENT AND TRADEMARK OFFICE
CERTIFICATE OF CORRECTION

PATENT NO. : 7,617,084 B1
APPLICATION NO. : 10/784125
DATED : November 10, 2009
INVENTOR(S) : Koslow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Fourteenth Day of December, 2010

David J. Kappos
*Director of the United States Patent and Trademark Office*